Nov. 6, 1956

G. LIENHARD 2,769,242

GAUGING DEVICE

Filed June 20, 1955

INVENTOR

Gottlieb Lienhard

BY
Munn, Liddy, Nathanson & March
ATTORNEYS

United States Patent Office 2,769,242
Patented Nov. 6, 1956

2,769,242

GAUGING DEVICE

Gottlieb Lienhard, Temple, Pa., assignor to Roco Manser Precision Engineering Corporation, Temple, Pa., a corporation of Pennsylvania Application June 20, 1955, Serial No. 516,687

13 Claims. (Cl. 33—147)

This invention relates to gauging devices, and more particularly to precision gauging devices adapted to accurately measure various dimensions of work pieces.

An object of the invention is to provide an improved gauging device adapted for use with a dial indicator, to measure various surfaces of relatively small work pieces.

Another object of the invention is to provide an improved gauging device as above set forth, which may be readily calibrated or adjusted by means of standard gauge blocks usually available in a shop.

A still further object of the invention is to provide an improved gauging device as above characterized, which is virtually universal in its application whereby it may be utilized for measuring not only upper but also lower and side surfaces of work pieces.

A feature of the invention resides in the provision of a novel and improved gauging device in accordance with the foregoing, which will enable the work pieces to be very quickly and easily gauged or measured.

Another feature of the invention resides in the provision of a gauging device as above set forth, wherein the dial indicator may be easily and quickly replaced or changed, when the occasion arises.

A still further feature of the invention resides in the provision of an improved gauge as above characterized, wherein the change over required to gauge or measure different surfaces of the work piece may be quickly and easily accomplished.

Still another feature of the invention resides in the provision of a novel gauging device which has all of the above advantages and is nevertheless relatively simple in its construction, and economical to manufacture.

Other features and advantages will hereinafter appear.

In the drawings accompanying this specification, similar characters of reference indicate corresponding parts in the several views, in which.

Figure 1:
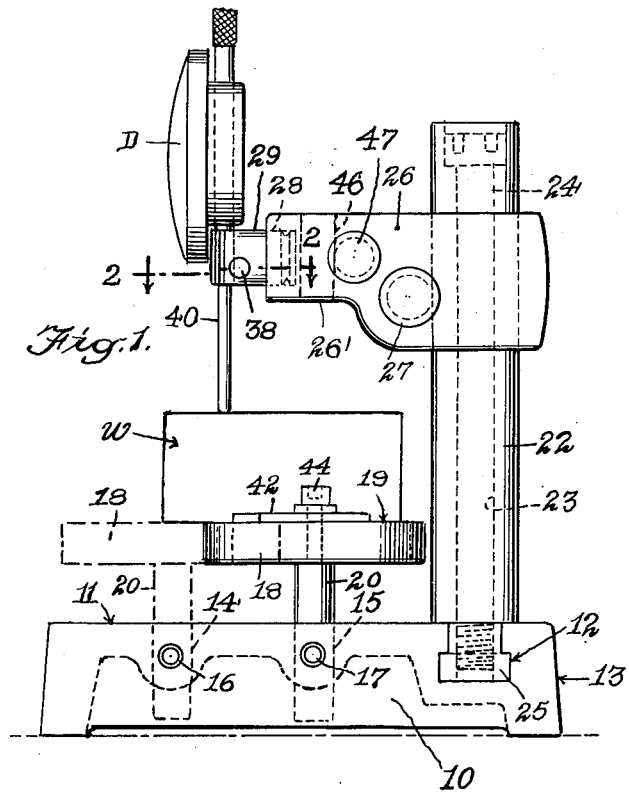
Fig. 1 is a side elevational view of the improved gauging device of this invention, having incorporated in it a dial indicator. The device is shown as measuring or gauging the thickness of a work piece in the form of a rectangular block.
Figure 2:
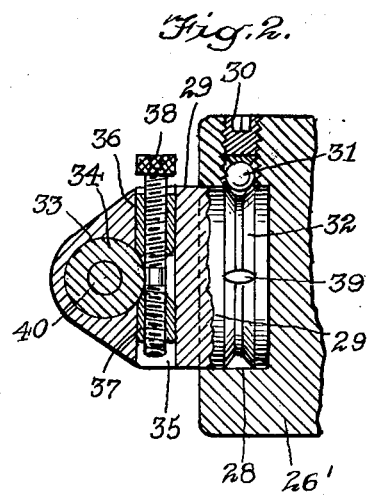
Fig. 2 is a fragmentary horizontal section taken on line 2—2 of Fig. 1.
Figure 3:
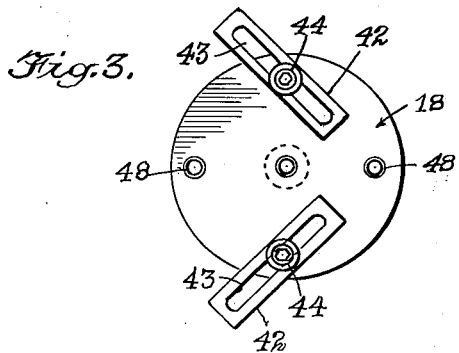
Fig. 3 is a top or plan view of the table of the device.

Referring to Figs. 1–3 the improved gauge device of this invention comprises a base 10 which is preferably formed of metal, and which may be advantageously made of cast iron, with a flat, machined upper surface 11 and a milled or otherwise machined T-slot 12 extending along a side edge 13. The base 10 may be provided with vertically-extending holes 14 and 15 which are intersected by horizontally extending holes 16 and 17 respectively, the latter holes being threaded to carry set screws (not shown) by which there may be gripped and clamped a shaft or pin extending into said vertical holes.

For the purpose of supporting a work piece, indicated as W, I provide a table 18 in the form of a disc having a perfectly flat upper surface 19, said table having a shank 20 extending downwardly and arranged to be slidably received in one of the holes 14, 15 to be clamped by set screws when provided in the holes 16, 17. The holes 14 and 15 are at right angles to the upper surface 19 of the table 18, and said surface is preferably carefully machined and finished so that it is at right angles to the clamped shank 20.

On the base 10 I provide an upright 22 in the form of a cylindrical post, having a bore 23 receiving a bolt 24 which is threaded into a nut 25 carried in the T-slot 12. The cylindrical surface of the upright 22 is carefully machined and finished to be accurate, and the lower end of the upright is faced off and finished perfectly perpendicular to the cylindrical surface, thereby to insure the upright extending upward from the surface 11 of the base at right angles.

It will be understood that by loosening the bolt 24 the upright 22 may be shifted along the side edge 13 of the base to various desired positions, and that by tightening the bolt the upright may be clamped in any of said positions.

In accordance with this invention I provide a novel means for mounting a dial indicator D on the upright 22 whereby the indicator may be variously positioned quickly and accurately with respect to a work piece carried on the base 10. This means comprises an arm 26 having a clamping means including a thumb screw 27 by which the arm may be locked in any rotative and vertically adjusted position.

The arm 26 has a reduced extremity 26' provided with a horizontal bore 28 in which there is received a hub 29, a snug fit being provided between the hub and bore to eliminate looseness. As shown in Fig. 2 the arm 26 has a set screw 30 engaging a detent means in the form of a steel ball 31 which is received in an annular groove 32 of the hub 29. By tightening the set screw 30 the hub 29 may thus be securely locked in any rotative position, and the hub may be easily turned when the set screw is loosened, to provide for various adjustments of the gauging device.

The hub 29 has a bore 33 arranged to closely receive a collar 34 of the dial indicator D, and has a second bore 35 intersecting the first, in which reversely threaded nuts 36 and 37 are disposed, carried on a reversely threaded screw 38. The nuts 36 and 37 are arranged to clamp between them the collar 34 of the dial indicator whereby the latter may be tightly clamped in any desired adjusted position on the hub 29.

For the purpose of predetermining certain positions in which it may be desired to clamp the hub 29 the latter may be provided with notches 39 in the grooves 32 thereof for engagement by the detent ball 31. The notches 39 may be so arranged that the hub has positions wherein the plunger 40 of the dial indicator extends either vertically upward or downward, or horizontally in either of opposite directions.

In order to enable a work piece W to be accurately positioned on the table 18, and to enable such positioning to be repeated at will I provide guide members 42 in the form of elongate flat strips having slots 43, said strips being clamped to the work table 18 by screws 44 extending through the slots 43 and threaded into the table. The guide 42 may be easily and quickly positioned in a wide variety of arrangements to suit various work piece configurations, and may be easily locked in their given positions by tightening the screws 44.

Referring to Fig. 1 the gauging device of this invention is shown as being employed for gauging or measuring the thickness of the work piece W, between the upper and lower faces thereof. Where the work pieces are to have a thickness between certain limits or tolerances, a gauge block may be placed on the table 18 for the dimension nearest to that desired. The arm 26 carrying the indicator D may then be lowered to bring the plunger 40 of the indicator in engagement with the upper surface of the gauge block. The indicator setting may be adjusted as desired, by shifting the arms 26 on the upright 22 or by shifting the indicator D in the hub 29. Upon this being done the gauge block may be removed from the table 18 and a work piece substituted therefore on the table. The indicator D will then show the deviation in the thickness of the work piece, as compared with the figure established by the gauge block.

To suit various shapes and sizes of work pieces, the table 18 may be shifted to one or the other of the holes 14, 15 in the base 13, and may be lowered or raised as desired. Also the upright 22 may be shifted along the T-slot 12, as found necessary or desirable.

Figure 4:
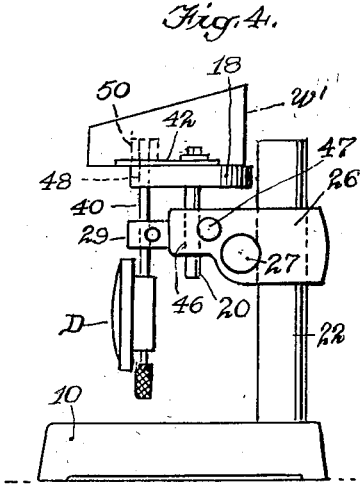
Fig. 4 is a side elevational view like Fig. 1 but showing the gauging device rearranged for gauging the depth of a hole in a work piece of other than rectangular configuration.

In accordance with this invention the dial indicator D and the work piece supporting table 18 may be variously positioned, to meet different conditions and shapes of work. For example, in Fig. 4 the dial indicator is shifted 180° from the position of Fig. 1, and the table 18 is mounted on the arm 26 in a bore 46 provided for the purpose, the shank 20 of the table being clamped by a set screw 47. The table 18 may have openings 48 through which the plunger 40 of the indicator may extend, and a work piece W carried by the table 18 having a recess 50 in its underside may have the depth of the recess gauged by the indicator. The holes 48 in the table 18 may be threaded to receive additional clamping screws for any purpose desired, and the table may be notched as is usual practice, to provide clearance where needed.

By virtue of the adjustable mounting for the indicator on the arm 26 and the adjustability of the arm 26 and upright 22 with respect to the base 10 the gauging device of this invention may be utilized to gauge or measure many different shapes and styles of work pieces. The adjustment or arrangement of the gauging device may be easily and quickly effected, and by tightening the various set screws the components may be accurately positioned to carry out precise measurements. The gauging device is seen to be relatively simple in its construction, having few components which may be easily and quickly produced and assembled. Accordingly it is relatively economical to manufacture. The construction is sturdy, and with the parts properly heated and hardened the useful life will be very appreciable.

Variations and modifications may be made within the scope of the claims and portions of the improvements may be used without others.

I claim:

1. A gauging device comprising a base; an upright carried by the base; means for adjustably mounting a dial indicator on the upright, to enable said indicator to be swung between two positions with its plunger extending either vertically upward or vertically downward; a table for holding a workpiece; means for adjustably mounting the table on the base below the indicator mounting means; and means for adjustably mounting the table on the upright above the indicator mounting means whereby a workpiece carried by the table may be gauged by the indicator for either position of the table.

2. The invention as defined in claim 1 in which the means for mounting the indicator includes an arm carried by and extending laterally of the upright, and includes a hub extending horizontally from and turnable in said arm.

3. The invention as defined in claim 2 in which the arm has a recess receiving the hub, and detent means disposed in said recess for engagement with the hub, and in which the hub has an annular groove engaged by the said detent means.

4. The invention as defined in claim 3 in which there are notches in the groove engageable by the detent means to locate the dial indicator with its plunger in predetermined vertical and horizontal positions.

5. The invention as defined in claim 2 in which the hub has a bore arranged to receive the collar of the indicator, and in which there is a screw and reversely threaded nuts thereon, carried by the hub, said nuts being adapted to engage the indicator collar within the said bore for clamping the same.

6. The invention as defined in claim 1 in which the means for mounting the indicator enables the same to be positioned with its plunger extending horizontally in either of opposite directions, thereby to gauge vertical surfaces of a workpiece carried by said table.

7. The invention as defined in claim 6 in which the means for mounting the indicator enables the same to be placed in different, horizontally-spaced positions with respect to the base.

8. The invention as defined in claim 1 in which the means for mounting the table above the indicator includes a part of said means for mounting the indicator.

9. The invention as defined in claim 1 in which the means for mounting the indicator includes a hub carried by the upright, said hub having a bore arranged to receive the collar of the indicator, and in which there is a screw and reversely threaded nuts thereon, carried by the hub, said nuts being adapted to engage the indicator collar within the said bore for clamping the same.

10. The invention as defined in claim 1 in which the table has adjustable guide members to position the workpiece, said members comprising elongate slotted strips.

11. The invention as defined in claim 1 in which the the means mounting the table includes a shank carried by the table, extending into a recess in the base and adjustable therein.

12. A gauging device comprising a base; an upright carried by the base; a dial indicator; means adjustably mounting the dial indicator on the upright, enabling said indicator to be swung between two positions with its plunger extending either vertically upward or vertically downward; a table for holding a workpiece; means for adjustably mounting the table on the base below the indicator; and means for adjustably mounting the table on the upright above the indicator whereby a workpiece carried by the table may be gauged by setting the indicator in one or the other of the said positions.

13. The invention as defined in claim 1 in which the upright has a through bore axially thereof, in which there is a bolt in said bore, and in which the base has a T-slot in its upper surface and a nut in said slot, receiving the bolt by which the support is adjustable laterally of the base.

No references cited.